United States Patent

Fink-Straube et al.

(10) Patent No.: US 6,463,760 B1
(45) Date of Patent: Oct. 15, 2002

(54) METHOD FOR THE PRODUCTION OF OPTICAL LAYERS HAVING UNIFORM LAYER THICKNESS

(75) Inventors: Claudia Fink-Straube; Axel Kalleder, both of Saarbruecken; Thomas Koch, Schweich; Martin Mennig, Quierschied; Helmut Schmidt, Saarbruecken-Guedingen, all of (DE)

(73) Assignee: Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 09/763,644

(22) PCT Filed: Sep. 3, 1999

(86) PCT No.: PCT/EP99/06513

§ 371 (c)(1),
(2), (4) Date: Feb. 23, 2001

(87) PCT Pub. No.: WO00/14023

PCT Pub. Date: Mar. 16, 2000

(30) Foreign Application Priority Data

Sep. 6, 1998 (DE) .......................................... 198 40 525

(51) Int. Cl.⁷ .................................................. C03B 8/00
(52) U.S. Cl. ........................ 65/17.2; 65/60.51; 65/60.53; 65/60.8; 427/110; 427/162; 427/165; 427/168; 427/169; 427/427; 427/452; 427/453; 427/454
(58) Field of Search ............................... 65/17.2, 60.51, 65/60.53, 50.8; 427/110, 162, 165, 168, 169, 427, 452, 453, 454

(56) References Cited

U.S. PATENT DOCUMENTS 5,716,424 * 2/1998 Menning et al.
5,795,642 * 8/1998 Ishikawa et al.

FOREIGN PATENT DOCUMENTS

EP 775669 * 5/1997
WO 98/08775 * 3/1998

* cited by examiner

Primary Examiner—Michael Colaianni
(74) Attorney, Agent, or Firm—Heller Ehrman White & McAuliffe LLP

(57) ABSTRACT

The wet film thickness during spraying of the coating composition onto the substrate is preferably adjusted such that it is greater by a factor of at least 8 than the target dry film thickness.

14 Claims, No Drawings

METHOD FOR THE PRODUCTION OF OPTICAL LAYERS HAVING UNIFORM LAYER THICKNESS

The invention relates to a method of producing optical layers of uniform thickness, in particular to a method of producing layers of high optical quality on transparent shaped articles, for example on flat glass or on active or passive optical components.

Because of the stringent requirements imposed on the uniformity of optical layers, they are produced almost exclusively by gas phase deposition (PVD/CVD) or by dipping processes. In the case of the dipping processes, very uniform layers can be obtained, since, with vibrationless dipping with a uniform drawing rate, the layer thickness may be calculated with great precision, in accordance with the formulae of Landau and Lewitsch and the investigations of James and Strawbridge, from the parameters of the coating solution and the drawing rate. If the substrate is drawn out in a dust-free environment and with a very uniform drawing rate, outstanding layers are obtained. In order to obtain a suitable optical result it is necessary for such layers to achieve a precision in the range of a few nm. Results of a similarly advantageous nature, albeit on smaller surfaces, are achieved by means of spin coating processes, where a rotating substrate is coated with the coating solution and this solution is then distributed uniformly over the surface by the centrifugal force.

The layer thicknesses required in order to achieve optical effects are generally below the wavelength of the light used (e.g. $\lambda/4$ layers), since it is in this range that it is possible by interference, especially in the case of multiple layers with different refractive indices, to achieve corresponding optical effects (reflection, antireflection, interference).

A disadvantage of the abovementioned processes is that spin coating is restricted to very small substrates and dip coating is a relatively complex technology. For coating processes with an optical effect, many investigations have been carried out in the past into what is known as the sol-gel process. Such processes generally involve colloidal suspensions of inorganic particles in the nm range, which are in suspension in appropriate solvents (e.g. water or alcohols) and which, in the course of dip coating, form a nanoscale particulate film on the surface. In the case of $SiO_2$, the structures involved may also be different, more like polymers. These films are then densified to oxide layers by a thermal process and, generally, form highly resistant, uniform films on the glass surface. As a consequence of their microstructure dimensions in the nm range, these layers exhibit virtually no light scattering and are therefore transparent. A technological problem with such processes is that the sols have only a limited lifetime, are sensitive to moisture, generally require stabilization with acids, and, especially in the case of extensive applications, permit a very small yield (ratio of amount of sol used to layer deposited on the surface). In general, this yield is less than 10%, so that besides high costs there are also environmental problems which occur with the disposal of the sols.

Previous investigations into other coating methods have shown that they cannot be used to obtain sufficiently uniform layers, since, because of the low thickness of such layers, it is not possible for flow within the film to compensate for different layer thicknesses. For example, it is not possible to conceive of a layer compensation process taking place over an area of several $m^2$ within a finite period.

Against this background, an object of the invention was to provide a method of producing optical layers which allows the uniformity of the layer thickness to be adjusted over large areas in such a way that, by way of the abovementioned flow processes, only low levels of material transport are necessary on the substrate surface, with the end effect that very uniform layer thicknesses are achieved.

This object is achieved in accordance with the invention in that a coating composition prepared by the sol-gel process and comprising a high-boiling solvent (the composition being referred to below as the sol-gel coating material) is sprayed onto a substrate using a commercially customary flat spraying unit and is subsequently heat-treated. This result is surprising insofar as neither the literature nor the practical art was known to contain indications that sol-gel materials in optical quality and in layer thicknesses significantly below 1 $\mu$m may be applied by way of a spraying process.

The spraying of the substrate in the flat spraying unit should take place under conditions which ensure maximum uniformity of the layer thickness. It has been found that this objective may be achieved if, during the spray application of the sol-gel coating material, the wet film thickness is adjusted such that it is greater by a factor of preferably at least 8 (eight) than the target dry film thickness, i.e. the layer thickness following removal of the solvent or solvents by drying.

In this connection, the wet film thickness is preferably in the range from 800 nm to 100 $\mu$m, while the dry film thickness is preferably from 100 nm to 10 $\mu$m.

Further aspects of a very highly uniform coating of the substrate with the sol-gel coating material are the setting parameters of the flat spraying unit, such as nozzle type, nozzle pressure and nozzle movement and, in particular, a very large distance of the spray nozzles (e.g. 30 cm or more) from the substrate surface. The effect of this is that, by means of the air movements generated by the nozzles (e.g., eddies), compensation of the mass flow density occurs such that, when the spray droplets impinge on the substrate surface, the required high uniformity is achieved. In one particular embodiment of the method of the invention it is possible to use special spray guns, e.g. those with a HVLP (high volume low pressure) option.

It has been found that, for example, with a lateral substrate transport rate of 0.47 $m.min^{-1}$ to 1.67 $m.m^{-1}$ and appropriate technical parameters (layer application: <5 $g.m^{-2}$ at solids contents <15% mass fraction) it is possible to obtain layer thicknesses of from 100 nm up to several micrometers (e.g. 5 $\mu$m) which have a range of fluctuation of <±5%. These values are sufficient to make it possible to use flat glass coated in accordance with the invention, for example, for glazing purposes.

Another important aspect is the ventilation of such units, which is necessary during the implementation of industrial processes, for reasons of workplace safety and environmental protection. In order to prevent a health hazard caused by the solvents used, and to prevent the emergence of solvent droplets into the atmosphere, spraying units of this kind may be operated only with effective waste-air units. The supply of fresh air which this necessitates, in conjunction with the extremely small droplet size of the spraying units, however, causes rapid removal of solvents from the droplets, so that these droplets, as a result in turn of the need for uniform mass flow between the spray nozzles and the substrate and for the large distance of the nozzles from the substrate, at the point of impingement on the surface, arrive as particulate solids when customary sols (nanoparticle suspensions in water or organic solvents such as monohydric alcohols, for example) are used and are therefore no longer capable of inducing the necessary layer thickness compensation at the surface.

This problem is solved in accordance with the invention in that, in addition to the solvents which are used or form in the sol-gel process, the sols are admixed with high-boiling solvents which do not lead to dryout of the droplets under the coating conditions and at ambient temperatures. High-boiling solvents in this context are solvents having a boiling point above 120° C., preferably above 150° C. Preferred examples of suitable high-boiling organic solvents are glycols and glycol ethers, such as ethylene, propylene or butylene glycol and the corresponding dimers, trimers, tetramers, pentamers or hexamers, and also the corresponding monoethers or diethers, in which one or both hydroxyl groups may be replaced, for example, by a methoxy, ethoxy, propoxy or butoxy group; terpenes, e.g. terpineol; and polyols, e.g. 2-methyl-2,4-pentanediol. Specific high-boiling solvents are polyethylene glycols and their ethers, such as diethylene glycol, triethylene glycol and tetraethylene glycol, diethylene glycol diethyl ether, tetraethylene glycol dimethyl ether or diethylene glycol monobutyl ether. Of these, diethylene glycol, tetraethylene glycol and diethylene glycol monobutyl ether are particularly preferred. It is of course also possible to use mixtures of two or more of these solvents.

The high-boiling solvent accounts preferably for from 1 to 50% by volume, with particular preference from 10 to 40% by volume of the liquid phase of the sol-gel coating material used in accordance with the invention.

As solid components of the sol-gel coating material it is possible to use the inorganic or organically modified inorganic components amenable to the sol-gel process, preferably oxidic or organically modified oxidic components. Examples of sol-gel systems of this kind are described in WO 95/13249, WO 95/28663 and DE 19714949, incorporated here in their entirety by reference.

Inorganic coating components are, for example, oxide components of elements which form glass or ceramic, such as $SiO_2$, $TiO_2$, $ZrO_2$, $PbO$, $B_2O_3$, $Al_2O_3$, $P_2O_5$, alkali metal oxides and alkaline earth metal oxides, and also cerium oxides, molybdenum oxides, tungsten oxides and vanadium oxides. For their preparation, the elements specified are commonly used in the form of compounds such as alkoxides, complexes or soluble salts. With these systems, the sol-gel reaction is conducted in solvents such as water, alcohols, carboxylic acids or mixtures thereof, with or without the addition of a condensation catalyst (e.g. an acid or base).

One particular embodiment of organically modified inorganic components that may be used comprises the sols described in DE 19746885, in which the sol particles have addition-polymerizable or polycondensable surface groups (e.g. epoxy or (meth)acrylic groups).

In addition to the abovementioned inorganic or organically modified inorganic components the sol-gel coating material may comprise further components, examples being pre-prepared nanoparticles as described, for example, in WO 93/06508. These nanoparticles may be added, for example in the form of powders or sols. Further suitable additives include, for example, dyes, pigments or pigment precursors and surfactants. If the organically modified components include addition-polymerizable or polycondensable groups, it is also possible to add corresponding catalysts/initiators for the thermal and/or photochemical curing.

The solids content of the sol-gel coating material is commonly below 15% mass fraction. In specific cases, however, it is also possible to employ higher mass fractions. A preferred range is from 1 to 15%, in particular from 5 to 10%.

Examples of suitable substrate materials for the method of the invention are glass, ceramic, plastics, metals (e.g. stainless steel or aluminium) and paper, preference being given to transparent substrates.

The heat treatment of the substrate sprayed with the sol-gel coating material comprises at least a drying (separation of the solvent), but may also include thermal (e.g. with IR radiation) and/or photochemical (e.g. with UV radiation) curing or thermal densification (sintering) of the layer. It is also possible, employing appropriately high heat treatment temperatures, to convert organically modified layers into inorganic, vitreous layers by burning out the organic compounds.

Prior to the heat treatment or after the drying, the coating material applied to the substrate may, if desired, be microstructured by means, for example, of embossing processes, photolithography, holography, electron beam lithography or direct laser writing.

In accordance with the invention it is also possible to apply two or more layers in succession to the substrate.

The method of the invention is suitable for producing decorative or functional sol-gel coatings, especially photochromic systems, electrochromic systems, colour layers, reflection or antireflection layers or multilayers, which may find application in the architectural field (e.g. as facade elements), in the automobile field (e.g. as glazing), in the production of mirrors, in the production of optical components, in the interior architectural field (e.g. tiles, glazing), for furniture and fitments, for displays, and for protective coatings of all kinds.

The examples which follow illustrate the invention without restricting it. The abbreviations used are as follows:
DIAMO: 3-(2-aminoethylamino)propyltrimethoxysilane
GPTS: 3-glycidyloxypropyltrimethoxysilane
TEOS: tetraethoxysilane

EXAMPLE 1

Preparation of $PbO-SiO_2$ Layers Containing Gold Colloid 1.88 g of $H[AuCl_4].3H_2O$ are dissolved in 30 ml of ethanol and 1.16 g of DIAMO. To this solution are added 50 ml of prehydrolysed GPTS/TEOS base sol (described in the preparation example of WO 95/13249). This mixture is added dropwise to a second solution, consisting of 4.25 g of $Pb(ac)_2$, 30 ml of methanol and 2.91 g of DIAMO, and the system is stirred for 10 minutes.

The sol obtained, containing gold colloid, is diluted with a solvent mixture consisting of 120 ml of ethanol, 120 ml of isopropanol, 120 ml of n-butanol, 24 ml of butyl glycol and 24 ml of tetraethylene glycol. This diluted sol is used to coat float glass plates measuring 35×35 cm using a flat spraying unit from Venjakob. The atomizer caps of the 2 standard guns (from Devilbiss), which are fastened perpendicularly to the glass substrate on an axle, are offset by 90° in order to achieve a cross-pass. The distance between the target substrate and the spraying head is 30 cm. The admission pressure of the material was set at 0.7 bar and the atomizer pressure at 4.2 bar. The belt speed can be varied between 0.47 and 1.67 meters per minute. The layers are dried at 150° C. for 15 minutes, heated to 450° C. at 150 K/h and densified at 450° C. for 30 minutes.

EXAMPLE 2

Preparation of $SiO_2$ Layers Containing Gold Colloid

The synthesis of the gold sol takes place in accordance with Example 8 of WO 95/13249. The sol obtained is diluted in a ratio of 1:3 with equal fractions of ethanol, isopropanol and n-butanol, and 5% by volume of butyl glycol and 5% by volume of tetraethylene glycol are added in each case. The spray parameters for the flat spraying unit, and the densification conditions, correspond to those of Example 1.

EXAMPLE 3
Preparation of Electrochromic WO₃ Layers

The electrochromic tungsten oxide layer is produced from an alcoholic peroxotungstic acid solution (WO 95/28663) prepared by reacting tungsten metal with hydrogen peroxide (30% strength aqueous solution), by initially introducing the peroxide solution, ethanol and acetic acid and adding the metal. The reaction temperature is held at 0° C. by means of a thermostated bath. Following the reaction, the solution is heated at 80° C. for 90 minutes. The clear solution is concentrated almost to dryness under reduced pressure (50 to 300 mbar). By dissolution in ethanol, a solution containing 20% by weight of peroxo acid is prepared, which following addition of lithium hydroxide in a concentration of 0.10 mol of lithium per mole of tungsten is diluted further with 0.57 ml of n-butanol per ml of solution. Finally, 0.06 ml of tetraethylene glycol is added per ml of overall solution.

The spray coating of the substrate (35×35 cm FTO-coated glass, FTO: fluorine-doped tin oxide) takes place by means of a flat spraying unit from Venjakob, equipped with automatic spraying units from Krautzberger (Type A-14, HVLP, two-fluid nozzles, nozzle set 0.5). The procedure is otherwise as in Example 1. The coated substrate is subjected to thermal aftertreatment at 240° C. for 60 minutes.

EXAMPLE 4
Na Silicate Sol+Colloids 1.88 g of H[AuCl₄].3H₂O are dissolved in 30 ml of ethanol and 1.16 g of DIAMO. To this solution are added 50 ml of a sodium silicate sol prepared in accordance with Example 2 of DE 19714949.

Further processing, application and densification take place in accordance with Example 1.

EXAMPLE 5
SiO₂ Sol+Pigments

The base sol is synthesized in accordance with Example 1 of DE 19714949. 5 g of a pigment (Iriodin 103, from Merck) are stirred in 50 ml of this sol.

The further processing, i.e. the dilution of this sol, the addition of tetraethylene glycol and the application, take place in the manner described in Example 1. The coatings are subsequently densified in a tunnel furnace at a target temperature of 500° C.

We claim:

1. A method for producing an optical layer of a desired uniform thickness on a substrate, comprising the steps of:
   (a) using a flat spraying unit, spraying onto the substrate a coating composition prepared by the sol-gel process, comprising an inorganic component or organically modified inorganic component and a liquid phase comprising a high-boiling solvent, to form a wet film having a wet film thickness that is at least eight times the desired thickness of the optical layer; and
   (b) heat-treating the wet film to form the optical layer of the desired thickness.

2. The method of claim 1 where the thickness of the film when wet is between 800 nm and 100 μm.

3. The method of claim 1 where the thickness of the film when dry is between 100 nm and 10 μm.

4. The method of claim 1 where the high-boiling solvent is selected from glycols, glycol ethers, polyglycols, polyglycol ethers, polyols, terpenes, and mixtures thereof.

5. The method of claim 1 where the high-boiling solvent comprises between 1% and 50% by volume of the liquid phase of the coating composition.

6. The method of claim 1 where the inorganic component or organically modified inorganic component is an inorganic oxide or an organically modified inorganic oxide.

7. The method of claim 6 where the inorganic oxide is selected from $SiO_2$, $TiO_2$, $ZrO_2$, PbO, $B_2O_3$, $Al_2O_3$, $P_2O_5$, alkali metal oxides, alkaline earth metal oxides, cerium oxides, molybdenum oxides, tungsten oxides, and vanadium oxides.

8. The method of claim 7 where the organically modified inorganic oxide is selected from nanoscale inorganic oxide particles having addition-polymerizable or polycondensable surface groups thereon.

9. The method of claim 1 where the coating composition comprises at least one additional component selected from nanoparticles, curing catalysts, dyes, pigments, pigment precursors, and surfactants.

10. The method of claim 1 where the step of heat-treating the film comprises drying the film and optionally further comprises at least one of curing, densifying, and burning-out the dried film.

11. The method of claim 1 comprising the additional step of microstructuring the film before the step of heat-treating the film or after drying the film.

12. The method of claim 11 where the step of microstructuring the film comprises embossing, photolithography, holography, electron beam lithography, or direct laser writing.

13. The method of claim 1 where at least two layers are applied in succession to the substrate.

14. The method of claim 5 where the high-boiling solvent comprises between 10% and 40% by volume of the liquid phase of the coating composition.

\* \* \* \* \*